Sept. 8, 1925.

H. F. ROACH

DIOPTRIC ANAMORPHOTE

Filed Sept. 15, 1924  2 Sheets-Sheet 1

1,552,453

INVENTOR:
HARRY F. ROACH
By ... 
ATTORNEY

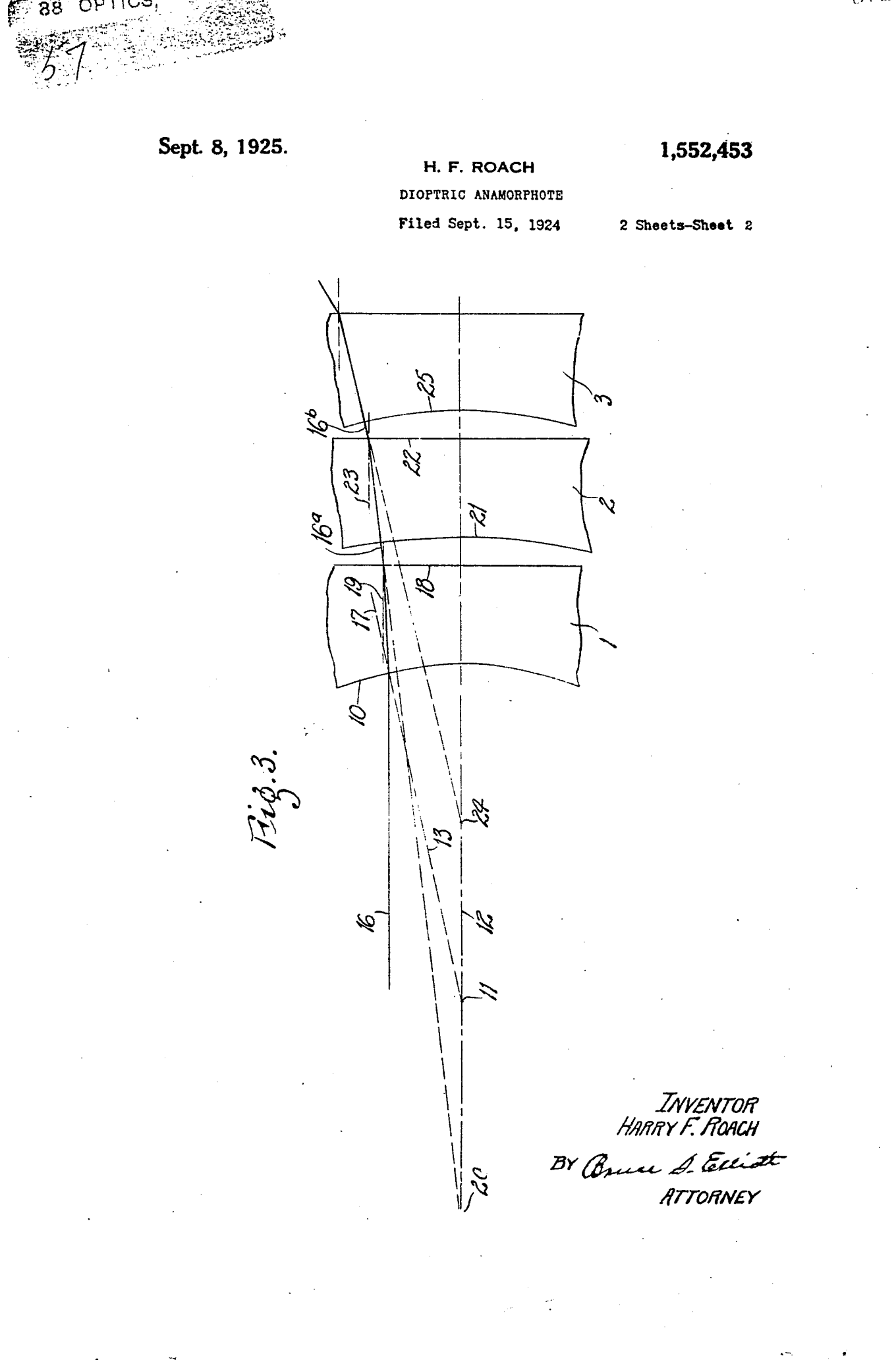

Sept. 8, 1925.

H. F. ROACH 1,552,453

DIOPTRIC ANAMORPHOTE

Filed Sept. 15, 1924  2 Sheets-Sheet 2

Fig.3.

INVENTOR
HARRY F. ROACH

BY Bruce S. Elliott
ATTORNEY

Patented Sept. 8, 1925.

1,552,453

UNITED STATES PATENT OFFICE.

HARRY F. ROACH, OF ST. LOUIS, MISSOURI.

DIOPTRIC ANAMORPHOTE.

Application filed September 15, 1924. Serial No. 737,710.

*To all whom it may concern:*

Be it known that I, HARRY F. ROACH, a citizen of the United States, residing in the city of St. Louis and State of Missouri, have invented new and useful Improvements in Dioptric Anamorphote, of which the following is a specification.

This invention relates to optical instruments of the type adapted to produce relative magnification of light rays on an axis of selection, with the object in view of altering the relative co-ordinate dimensions of the cross section of a pencil or pencils of light rays and of making a true and useful anamorphous image of an object from which light rays are reflected. In order to make an image properly and efficiently, this instrument should be used in combination with some optical ray-collecting system; where the instrument is used merely to expand or contract a pencil or pencils of light rays direct from a source of light, the conjoint use of an optical ray-collecting system is optional.

In prior work in this art, I have devised instruments for producing anamorphous projections of light rays, having curved reflecting elements, either of concave or convex form, the curved surfaces having either a circular or a conic section. Also, I have utilized total reflecting prisms, the reflecting surfaces of which were of either of the forms described.

The present invention is characterized by the fact that I utilize the principles and laws of light refraction in the projection of the rays, whereby various advantages are obtained, and a simpler and less expensive instrument may be manufactured for the purpose in view.

In order that my invention may be clearly understood, I desire to define a plano-concave cylinder glass element as one whose optical surface on one side is that of a section throughout of a concave curve, and on the opposite optical side is that of a plane throughout; and a plano-convex cylinder glass element as one whose optical surface on one side is that of a section throughout of a convex curve and on the opposite optical side is that of a plane throughout.

It is accepted as fact by those skilled in the art, that a ray of light impinging an optical glass element normal to its surface is not refracted on entering the glass medium, although very slight reflection of the ray from the optical glass surface occurs. When a ray of light proceeds in a rare medium towards a dense medium, both reflection and refraction occur at any angle of incidence of the ray; the greater the angle of incidence of the ray, the greater the relative amount of reflection and the less the relative amount of refraction.

When a ray of light proceeds in a dense medium towards a rare medium, at what is known as the critical angle of incidence of the ray, which is expressed by the formula—

$$\operatorname{Sin} < A = \frac{1}{N},$$

there occurs no refraction, and substantially all the ray is reflected; and as the sin never equals unity in value, it therefore follows that total reflection occurs only when the ray is proceeding in a dense medium towards a rare medium.

This condition is that known as total reflection; between the limitations of normal incidence of a light ray and that angle of incidence called the "critical angle" and outside of these limitations, as the angle of incidence increases, the angle of reflection increases; between the limitations of normal incidence of a light ray and that angle of incidence called the "critical angle" as the angle of incidence increases, the angle of refraction increases to a degree in harmony with the sin condition of the Snell law. This is also true where the above limitations are exceeded and the indices of the media are such as to permit the phenomena of refraction to exist.

It is accordingly advantageous to design any refracting optical system in the light of the above facts. In some refracting optical systems, reflection occurs which, under some conditions of use of the system, becomes serious in that it interferes with the brilliancy and definition of the image; this condition is referred to by those skilled in the art as "internal reflection". The present instrument is designed with the above facts in view. Accordingly, a very large radius of curvature is used for the first cylinder. The first curved surface receives paraxial rays other than those that are normal to the curved surface, and on all subsequent cylinders the rays enter the glass normal to the surface of curvature and impinge the flat surfaces at a very small angle of incidence. Any reflection that may occur at the flat surfaces will be reflected according to the well known law that the angle of incidence and the angle of reflection are equal. This reflection will cause a reflected portion of the rays to travel back into the system, but at an angle to their reception. In order to minimize the effects of this reflection, flat black integral diaphragms are introduced in the system which, when impinged by the reflected rays, will absorb them, whereby an optical instrument is produced called an "anamorphote", in the use of which there is produced an anamorphous image substantially free from the effects of internal reflection or reflections. A plurality of glass elements, permitting the possibility of the use of a very large radius for the cylinder of the first glass element, offers two distinct advantages; one, the minimizing of reflections at entrance of the rays into the instrument, and, two, the rays impinging upon the first cylinder are well within the paraxial zone arc of curvature of the first cylinder. This offers the commercial advantage of the use of a cylinder of circular section, and produces, as a result, an image having a degree of accuracy that is sufficient for most commercial use. This makes possible the production of an "anamorphote" at less expense than where more intricate curved cylinders are used.

If absolute theoretical accuracy is attempted, then the cylinders must be ground to a cross-section of that of a conic section, and the curvature of the subsequent cylinders must be such that rays of light progressively impinge all curved cylinder surfaces theoretically normal to the respective surfaces.

In a reflecting anamorphote, it is necessary to alter the direction of the optical axis of the path of light to avoid the various difficulties present and known to those skilled in the art. While this alteration in no way affects the character of the work produced by the reflecting anamorphote, it occasions inconvenience to the operator, or user, in that the exit of the optical axis of the path of light from this instrument lies in a different plane from that of the entrance optical axis of the path of light. This objection, however, may be overcome, but only at an additional expense in the manufacture of the instrument and at the cost of an additional loss of light, which is undesirable.

With this refracting anamorphote, the planes of the optical axis of the path of light at the entrance to the instrument and at the exit of the instrument coincide. This is a decided advantage to the operator in the use of the instrument; also, the manufacture and assembly of the glass elements are simplified, and an instrument produced at less cost than that of a reflecting instrument, and in the use of which an image of substantial accuracy may be produced.

Refracting plano-convex cylinders may be used by obeying the same optical conditions, namely: that the curvature of the first cylinder may be very large and the curvature of the subsequent respective cylinders be progressively altered a mathematical degree so as to permit the rays to impinge upon the curved surface of each respective glass element normal thereto. As a convex optical element is converging in effect, while a concave element is diverging in effect, the use of convex cylinders would result in the production of an image of anamorphosis, but on a different axis, which would be perpendicular to that produced by the plano-concave cylinders, assuming that the geometric axis of the respective instruments when used were in the same plane.

According to the present invention, a relatively large number of refracting elements having curved surfaces of impingement are employed, the light rays impinging upon the first curved surface, being refracted at the surface, passing through the glass to the flat side thereof, at which surface the ray is refracted at a greater angle, thence impinging upon the curved surface of the next element and substantially normal to the same, and so on through the series of glass elements. The employment of a relatively large number of cylinders permits the use of a very large radius for the cylinder of the first glass element, whereby it is possible to insure that the impingement of the paraxial light rays shall be maintained well within the paraxial zone of the circular cylinder. The ray, upon entering the first glass, is refracted toward the line normal to the surface at the point of impingement of the ray, according to the Snell law. This ray then passes through the glass to the flat perpendicular surface, where it is refracted away from the line normal to this surface that is passed through the point of impingement of the ray. This is due to the fact that greater deflection of the light ray is occasioned during the passing of the ray from a dense to a rare medium. Hence, with a series of glass elements provided with curved cylindrical surfaces, formed as hereinafter described, each cylindrical surface being opposite the flat surface of the preceding element, the general relative magnification or expansion of the rays occurs substantially only at the flat surface of each glass element, except the cylinder of the first. The circle for the cylinder of the second and each succeeding glass element is described from a center determined in a manner to be hereinafter described, and the radius of each of these circles is such that the ray passing from the flat surface of each glass element is substantially perpendicular to the tangent of the succeeding cylinder passing through the point of impingement of the ray upon such cylinder. Hence, the ray passes into the dense glass medium of the second and succeeding glass elements without being refracted. In other words, its course is not changed. This process is continued throughout the succeeding glass elements. While it is true that by the use of this design of instrument, the ray partakes of whatever minute error there may be on the first cylinder of impingement of the paraxial rays, still the plurality of glasses permitted makes possible, as stated, the use of a very large radius for the first cylinder and reduces the impingement of the paraxial rays to well within the paraxial zone of the circular section of said cylinder, so that whatever error occurs, is so minute as to be negligible.

It should be further stated that where circles are used, as is the case here, to describe the sections of cylinders on the successive glass elements, all of the paraxial rays that impinge upon the first cylinder do not pass through the succeeding glass cylinders theoretically and absolutely normal to the tangent of the respective cylinders passing through the point of impingement of the light rays thereon. Substantially, however, they do so pass. To make the direction of these rays theoretically true, the cylinders should have a section described by some conic section, and the radii of the conic section, or the curvature of the conic section, should be such on each glass element that a tangent drawn to the conic section through the point of impingement of the light ray thereon should be perpendicular to the light ray of all paraxial rays of the first incidence, in which event there would result a theoretically perfect uniform image throughout the entire relative magnification axis. For most work, this refinement is unnecessary.

Having thus set forth the general purpose of the invention, I will now describe the same in detail, referring to the accompanying drawings, in which—

Figure 3 is a diagrammatic view illustrating the manner of determining the length of the radius of each glass element after the first.

Figure 1:
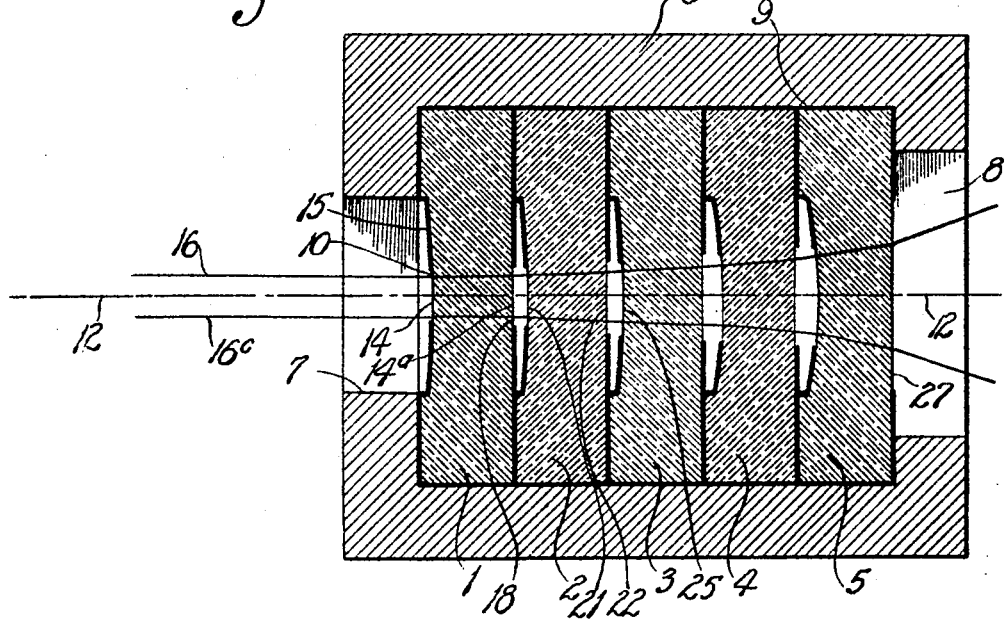
Figure 1 is a cross-sectional view through an instrument constructed according to my invention.
Figure 2:
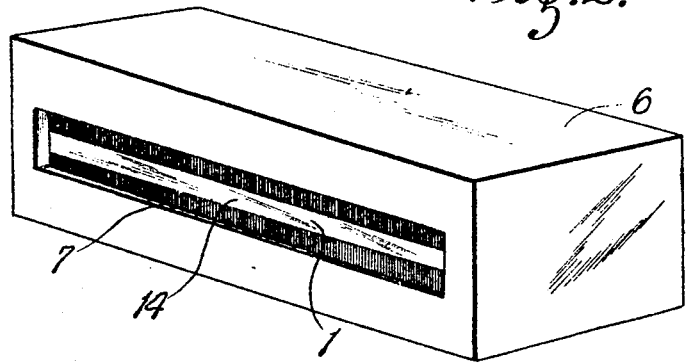
Figure 2 is a perspective view of the instrument.

Referring now to the drawings, the numerals 1, 2, 3, 4 and 5 indicate, respectively, five glass elements enclosed within a casing 6, which is rectangular in cross-section and of greater length than width, and is preferably made of aluminum. On one side, this casing is provided with an entrance opening 7 which, in practice, is substantially one-half of an inch in width by about six inches in length. On the opposite side, the casing is provided with an exit opening 8 which, in practice, is substantially three-quarters of an inch in width by about six inches in length. The entire interior surface of the casing 6 is covered with flat black, indicated by 9. The glass element 1 is provided on its side facing the optical opening 7 with a concave cylindrical surface 10 (Figure 3), the curve of which is described from a center 11 on the optical axis 12 with a radius 13, in the present instance, of approximately fifteen inches. All of the surface of the cylinder 10, other than a space providing an optical opening 14 of a selected width, in the present instance, one-eighth of an inch and having a length of six inches, is covered with flat black 15. The flat side of glass element 1 is also covered with flat black except for a space providing an exit optical opening $14^a$, of the same length as, but of slightly greater width than, the optical opening 14. The succeeding glass elements are similarly provided with gradually enlarged optical openings. The manner of determining the length of radius for the curve of each cylinder after the first will now be described.

The numeral 16 indicates the uppermost ray of a beam of light passing through the optical opening 14 of the first glass element. This ray, upon entering the glass 1, according to the Snell law, is refracted towards a line 17 normal to the surface at a point of impingement of the ray. The ray passes through the glass to the flat perpendicular surface 18, where it is refracted, through the optical opening $14^a$, away from the line 19, normal to this surface that is passed through the point of impingement of the ray. This is due to the fact, as stated above, that greater deflection of the light ray is occasioned during the passing of the ray from a dense to a rare medium. This refracted part of the ray is indicated at $16^a$. I now project this ray back until it intersects the optical axis 12. This point of intersection is indicated at 20, and is the center of the circle for the cylinder 21 of the second glass element. This insures that the portion $16^a$ of the ray shall be perpendicular to the tangent of the cylinder 21 passing through the point of impingement of the ray $16^a$ upon the cylinder; hence the ray passes into the dense glass of the second element without being refracted. At the flat surface 22 of the second glass element, the ray is refracted, upon entering the rare medium between glasses 2 and 3, away from the line 23 normal to the flat surface 22 that is passed through the point of impingement of the ray. This part of the ray is indicated at $16^b$.

The line of this ray is then projected back until it intersects the optical axis 12 at 24, this point of intersection forming the center for describing the curve for the cylinder 25 of the third glass. In a similar way, the center for the circle of each succeeding cylinder is determined.

To give some idea of the relation of the cylinders to each other and without giving fractional parts of an inch, it may be stated that, starting with a radius of approximately 15 inches for the cylinder of the first glass element, and with the glass elements having a maximum thickness of one-fourth of an inch and a minimum thickness of three-sixteenths of an inch, the second cylinder will have a radius of 29. inches+, the third, 19. inches+, the fourth, 13. inches+, and the fifth, 8. inches+.

Any desired number of glasses may be employed, and, in practice, I contemplate using anywhere from three to eleven glasses, or more.

Referring to Figure 1, where I have shown the course of the upper ray 16 and a lower ray 16ᶜ passing into the instrument through the entrance opening 7, it will be seen that, as a result of the construction of the cylinders as described above, these rays will be expanded or dispersed, according to a known law of refraction, until they emerge and are finally refracted from the perpendicular surface 27 of the final glass element 5. As will readily be seen, there results relative magnification on the selected axis, and all of the rays are in the paraxial zone of the instrument. The anamorphous projection of the image or object from which the rays 16 and 16ᶜ emanate will, furthermore, be uniform through the relative magnification axis.

In the use of cylinders of a circular section, such as shown, the height of the image to be relatively magnified is limited to the paraxial zone of the cylinder of the first glass element.

Should it be desired to increase the height of the image under observation beyond that which would enable it to come within the paraxial zone of the cylinder of the first glass element, then the cylinders should have the form of a conic section of proper radii, in which event any height of the image may be observed, provided the instrument is made large enough for that height, and the image will be theoretically perfectly uniform throughout the entire height on the relative magnification axis. The use of plano-concave refracting cylinders according to my invention, whether the cylinders be of circular or conic section, results in giving a substantially true anamorphous image with excellent definition of the object. This is due to the fact that the zones of the image on the ordinate thereof will approach uniformity in the unit value of relative magnification in the case of cylinders of a circular section, while, with cylinders of a conic section, there will be absolute uniformity.

It is recognized that chromatic aberrations and magnifications occur in the passage of light rays through glass. These may be corrected in any one of several ways; but, preferably, I use a contrast ray filter in conjunction with my instrument, so as to eliminate all rays of the spectrum save that of a narrow band of selection.

An instrument having the cylinders of the glass elements formed as described, is preferred by me, due to the fact that for all practical purposes, the image produced by its use is practically uniform through the relative magnification axis; and, where cylinders of a conic section are employed, such uniformity, as stated, would be absolute. I have, however, employed an instrument consisting of three glass elements having cylinders of circular section and of equal radii. In the use of such an instrument, there should be a theoretical difference of the relative magnification at the top and bottom of the image from that of the center of the image in the zone of the optical axis plane; but this difference is so small that it is negligible. Therefore, for some character of work, such an instrument possesses sufficient accuracy to render its use practical.

I claim:

1. An optical instrument, comprising a series of plano-concave cylinder glass elements arranged in juxtaposition with their concave sides facing in the same direction, and provided with alining optical entrance and exit openings to permit the passage of light rays therethrough and the successive and progressive refraction thereof.

2. An optical instrument, comprising a series of plano-concave glass cylinder elements arranged in juxtaposition with their concave sides facing in the same direction, and provided with alining optical entrance and exit openings to permit the passage of light rays therethrough and the successive and progressive refraction thereof, the concave surfaces having a circular section.

3. An optical instrument, comprising a series of plano-concave cylinder glass elements arranged in juxtaposition with their concave sides facing in the same direction, and provided with alining optical entrance and exit openings to permit the passage of light rays therethrough and the successive and progressive refraction thereof, the concave surfaces of the glass elements after the second, having successively smaller radii.

4. An optical instrument, comprising a series of plano-concave cylinder glass elements arranged in juxtaposition with their concave sides facing in the same direction, and provided with alining optical entrance and exit openings to permit the passage of light rays therethrough and the successive and progressive refraction thereof, the concave surface of the first glass element having a relatively large radius, the concave surface of the second glass element having a still larger radius, and the concave surfaces of the succeeding glass elements having successively smaller radii.

5. An optical instrument, comprising a series of plano-concave cylinder glass elements arranged in juxtaposition with their concave sides facing in the same direction, and provided with alining optical entrance and exit openings to permit the passage of light rays therethrough and the successive and progressive refraction thereof, the radius of the curve of each concave surface after the first being such that the ray passing from the flat surface of each glass element is substantially perpendicular to the tangent of the curve of the adjacent concave surface passing through the point of impingement of the ray upon such surface.

6. An optical instrument, comprising a series of plano-concave cylinder glass elements arranged in juxtaposition with their concave sides facing in the same direction, and provided with alining optical entrance and exit openings to permit the passage of light rays therethrough and the successive and progressive refraction thereof, the concave surface of each element after the first being described from a center determined by projecting the line of refraction of the ray from the plane surface of a preceding glass element to the concave surface backward to intersect the optical axis plane, whereby the refracted ray will be perpendicular to the tangent of the curve described from said center passing through the point of impingement of the ray upon the concave surface of the respective glass elements.

7. An optical instrument, comprising a series of cylindrical glass elements, each element having a curved surface in section throughout on one side and a flat surface in section throughout on the other side, and arranged in juxtaposition with their curved surface sides facing in the same direction and provided with alining optical entrance and exit openings to permit the passage of light rays therethrough and the successive and progressive refraction thereof.

8. A refracting anamorphote having diaphragms providing optical openings and positioned in the path of reflected rays to serve the purpose of minimizing internal reflections.

9. A refracting anamorphote having integral diaphragms providing optical openings and positioned in the path of reflected rays to serve the purpose of minimizing internal reflections.

10. A refracting anamorphote involving a plurality of glass cylinders, the curved surface of the second cylinder being described from the point of intersection of a projected light ray, impinging said surface, with the optical axis of the system.

11. A refracting anamorphote involving a plurality of glass cylinders, the curved surface of the second cylinder being described from the point of intersection of a light ray, impinging said surface, with the optical axis of the system.

In testimony whereof, I have hereunto set my hand.

HARRY F. ROACH.